(12) United States Patent
Wiegers et al.

(10) Patent No.: US 12,060,193 B2
(45) Date of Patent: Aug. 13, 2024

(54) FACELESS LABELS AND RELATED SYSTEMS AND METHODS

(71) Applicant: AVERY DENNISON CORPORATION, Mentor, OH (US)

(72) Inventors: Ronald Wiegers, 's-Hertogenbosch (NL); Di Wu, 's-Hertogenbosch (NL)

(73) Assignee: Avery Dennison Corporation, Mentor, OH (US)

( * ) Notice: Subject to any disclaimer, the term of this patent is extended or adjusted under 35 U.S.C. 154(b) by 0 days.

(21) Appl. No.: 17/811,100

(22) Filed: Jul. 7, 2022

(65) Prior Publication Data

US 2022/0332457 A1 Oct. 20, 2022

Related U.S. Application Data

(62) Division of application No. 14/663,887, filed on Mar. 20, 2015, now Pat. No. 11,414,233.

(Continued)

(51) Int. Cl.
*B65C 9/26* (2006.01)
*B32B 27/08* (2006.01)
(Continued)

(52) U.S. Cl.
CPC ............ *B65C 9/26* (2013.01); *B32B 27/08* (2013.01); *B32B 27/10* (2013.01); *B32B 27/283* (2013.01); *B32B 27/32* (2013.01); *B32B 27/36* (2013.01); *B32B 29/002* (2013.01); *B32B 37/0046* (2013.01); *B32B 37/1207* (2013.01);
(Continued)

(58) Field of Classification Search
CPC .. B65C 9/26; B65C 9/02; B32B 27/08; B32B 27/10; B32B 27/283; B32B 27/32; B32B 27/36; B32B 29/002; B32B 37/0046; B32B 37/1207; B32B 38/10; B32B 2250/03; B32B 2451/00; B32B 7/12; B32B 9/00; B32B 33/00; B32B 37/12; B44C 1/1733; C09J 7/40; C09J 2203/334; C09J 2301/302; C09J 2301/312; C09J 2400/283; C09J 2423/006; C09J 2433/00; C09J 2467/006;
(Continued)

(56) References Cited

U.S. PATENT DOCUMENTS 3,013,917 A 12/1961 Karlan et al.
3,239,478 A 3/1966 Harlan, Jr.
(Continued)

FOREIGN PATENT DOCUMENTS

GB 827313 2/1960
WO 93/20788 10/1993
(Continued)

OTHER PUBLICATIONS

Merriam-Webster.com definition of "Graphic Design" (Year: 2024).*
(Continued)

*Primary Examiner* — Cynthia L Schaller

(57) ABSTRACT

Multilayer laminates are described which include one or more layers or regions of printed images or graphics captured under an outer adhesive layer. The laminates include two layers of a release coating applied to opposite faces of a support layer. Also described are systems and methods for applying wound rolls of the multilayer laminates to a collection of articles.

15 Claims, 3 Drawing Sheets

Related U.S. Application Data

(60) Provisional application No. 61/968,565, filed on Mar. 21, 2014.

(51) Int. Cl.
| | | |
|---|---|---|
| *B32B 27/10* | (2006.01) | |
| *B32B 27/28* | (2006.01) | |
| *B32B 27/32* | (2006.01) | |
| *B32B 27/36* | (2006.01) | |
| *B32B 29/00* | (2006.01) | |
| *B32B 37/00* | (2006.01) | |
| *B32B 37/12* | (2006.01) | |
| *B32B 38/10* | (2006.01) | |
| *B44C 1/17* | (2006.01) | |
| *B65C 9/02* | (2006.01) | |
| *C09J 7/40* | (2018.01) | |
| *G09F 3/02* | (2006.01) | |

(52) U.S. Cl.
CPC ............ *B32B 38/10* (2013.01); *B44C 1/1733* (2013.01); *B65C 9/02* (2013.01); *C09J 7/40* (2018.01); *G09F 3/02* (2013.01); *B32B 2250/03* (2013.01); *B32B 2451/00* (2013.01); *C09J 2203/334* (2013.01); *C09J 2301/302* (2020.08); *C09J 2301/312* (2020.08); *C09J 2400/283* (2013.01); *C09J 2423/006* (2013.01); *C09J 2433/00* (2013.01); *C09J 2467/006* (2013.01); *C09J 2483/005* (2013.01); *Y10T 156/17* (2015.01); *Y10T 428/2486* (2015.01)

(58) Field of Classification Search
CPC .... C09J 2483/005; G09F 3/02; Y10T 156/17; Y10T 428/2486
See application file for complete search history.

(56) References Cited

U.S. PATENT DOCUMENTS

| | | | |
|---|---|---|---|
| 3,276,933 A | | 10/1966 | Brant |
| 3,857,768 A | * | 12/1974 | Kagiya ................. C08F 291/00 522/120 |
| 3,896,249 A | | 7/1975 | Keeling et al. |
| 3,989,609 A | * | 11/1976 | Brack .................. C08G 18/671 428/458 |
| 4,626,284 A | | 12/1986 | Ohta et al. |
| 4,703,113 A | | 10/1987 | Baxter et al. |
| 4,963,189 A | | 10/1990 | Hindagolla |
| 5,026,427 A | | 6/1991 | Mitchell et al. |
| 5,084,317 A | | 1/1992 | Epple |
| 5,086,698 A | | 2/1992 | Wirz |
| 5,141,556 A | | 8/1992 | Matrick |
| 5,143,570 A | | 9/1992 | Freedman |
| 5,160,370 A | | 11/1992 | Suga et al. |
| 5,169,436 A | | 12/1992 | Matrick |
| 5,284,688 A | * | 2/1994 | Hiatt ......................... G09F 3/10 428/347 |
| 5,494,945 A | | 2/1996 | Kidon et al. |
| 5,543,231 A | | 8/1996 | Kidon et al. |
| 5,562,992 A | | 10/1996 | Kidon et al. |
| 5,654,093 A | | 8/1997 | Kidon et al. |
| 5,728,469 A | | 3/1998 | Mann et al. |
| 5,843,549 A | | 12/1998 | Mingus |
| 6,113,725 A | | 9/2000 | Kronzer |
| 6,180,228 B1 | | 1/2001 | Muller et al. |
| 6,235,363 B1 | | 5/2001 | Bilodeau |
| 6,423,406 B1 | | 7/2002 | Bilodeau |
| 6,486,267 B1 | | 11/2002 | Bilodeau |
| 6,607,800 B1 | * | 8/2003 | Brandt ....................... G09F 3/10 40/310 |
| 2002/0150734 A1 | * | 10/2002 | Snow ................... B41M 7/0027 428/204 |
| 2003/0021996 A1 | | 1/2003 | Gudimenko et al. |
| 2005/0074549 A1 | | 4/2005 | Su et al. |
| 2006/0003114 A1 | * | 1/2006 | Enlow ..................... B32B 27/08 428/32.24 |
| 2006/0029765 A1 | * | 2/2006 | Truog ......................... C09J 7/22 428/40.1 |
| 2008/0078498 A1 | * | 4/2008 | Zeik .......................... C09J 7/29 156/277 |
| 2010/0252187 A1 | | 10/2010 | Calderas et al. |
| 2014/0272153 A1 | * | 9/2014 | Buehne .................... C08K 5/12 264/165 |
| 2014/0311560 A1 | | 10/2014 | Betrabet et al. |

FOREIGN PATENT DOCUMENTS

| | | |
|---|---|---|
| WO | 2004/073967 | 9/2004 |
| WO | 2012/061962 | 5/2012 |
| WO | 2013/146235 | 10/2013 |

OTHER PUBLICATIONS

International Search Report and Written Opinion dated Jun. 9, 2015 issued in corresponding IA No. PCT/US2015/021703 filed Mar. 20, 2015.

International Preliminary Report on Patentability dated Sep. 21, 2016 issued in corresponding IA No. PCT/US2015/021703 filed Mar. 20, 2015.

"Make the Correct Choice," (PDF format) from screenshots of http://paperworks.com/about-paper-weights; taken from Internet Archive WayBackMachine dated Jan. 15, 2013.

"What is Mylar Paper-More than Just Decoration," (PDF format) from screenshots of http://www.jampaper.com/blog/what-is-mylar-paper/ (published Oct. 23, 2013).

\* cited by examiner

FACELESS LABELS AND RELATED SYSTEMS AND METHODS

CROSS-REFERENCE TO RELATED APPLICATIONS

The present application claims priority to U.S. patent application Ser. No. 14/663,887 filed Mar. 20, 2015, U.S. Provisional Application No. 61/968,565 filed Mar. 21, 2014, both of which are incorporated herein by reference in entirety.

FIELD

The present subject matter relates to multilayer laminates that include preformed or preprinted images or graphics, covered by an adhesive layer. The images or graphics can be transferred to an article of interest by contacting or otherwise adhering the adhesive with the article and thereby transferring the image or graphic to the article. The present subject matter also relates to systems and methods for applying the images or graphics from the laminates to one or more articles.

BACKGROUND

Adhesive transfer printing is well known in the art in various forms. Generally, one or more images or graphics are provided on a support layer, typically in the form of a sheet. A layer of an adhesive covers the images or graphics. The resulting sheet assembly can include letters, numbers, and/or graphic designs. A user transfers the images or graphics from the support layer to another surface by contacting the adhesive with the surface. After establishing an adhesive bond with the surface, the support layer is removed from the adhesive and images/graphics, which remain adhered to the surface. This practice has been described in various applications as dry transfer printing and disclosed for example in U.S. Pat. Nos. 3,013,917 and 3,276,933.

Many such sheeted graphic articles utilize a single layer of a release material between the image or graphics and the support layer. This is satisfactory for manually transferring desired images or graphics from the sheet. Typically, transfer of the image/graphic is performed by contacting the adhesive face of the sheet to the surface of interest and manually rubbing or pressing an opposite face of the sheet to establish an adhesive bond with the surface. Upon removal of the sheet, the release layer promotes separation of the image/graphic from the sheet.

Application of multiple adhesive transfers to bottles or containers in a continuous fashion is described in U.S. Pat. No. 3,896,249. That method employs a stack of adhesive transfers which can be individually and sequentially applied. The stack utilizes a layered stack arrangement in which a support layer is disposed between immediately adjacent release layers. The multiple release layers reduce the potential for neighboring adhesive transfers from adhering to one another.

Although satisfactory in many respects, a need remains in the art for laminates, systems, and methods enabling a wound or rolled laminate containing preprinted designs or images to supply the designs and subsequently apply such upon a plurality of surfaces under conditions typically encountered in high speed labeling operations.

SUMMARY

The difficulties and drawbacks associated with previously known systems are addressed in the present laminates, systems, and methods of the present subject matter.

In one aspect, the present subject matter provides a multilayer laminate comprising a support layer defining two oppositely directed faces, a first release layer disposed on one of the faces of the support layer, a second release layer disposed on another of the faces of the support layer, at least one preformed image or graphic disposed on the first release layer, and at least one adhesive layer disposed on the image or graphic. The release force of the first release layer is greater than the release force of the second release layer.

In another aspect the present subject matter provides a system for applying a preformed image or graphic from a multilayer laminate to an article. The system comprises a multilayer laminate including (i) at least two release layers, (ii) a support layer disposed between the release layers, (iii) an outermost adhesive layer, and (iv) a preformed image or graphic disposed between the adhesive layer and one of the release layers. The system also comprises a transfer line for dispensing the multilayer laminate, a conveyor for transporting at least one article, and an image application apparatus which contacts the outermost adhesive layer of the laminate to one article transported by the conveyor and then separates at least the support layer of the laminate from the adhesive layer and the image or graphic thereby applied to the article.

In yet another aspect, the present subject matter provides a method for applying a preformed image or graphic to a surface. The method comprises providing a multilayer laminate including (i) at least two release layers, (ii) a support layer disposed between the release layers, (iii) an outermost adhesive layer, and (iv) a preformed image or graphic disposed between the adhesive layer and one of the release layer(s). The method also comprises contacting the adhesive layer of the multilayer laminate with a surface to receive the image or graphic and establishing an adhesive bond between the adhesive layer and the surface. And, the method comprises separating at least the support layer from the adhesive layer contacting the surface. The adhesive layer and the image or graphic remain with the surface and are applied thereon.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

Figure 1:
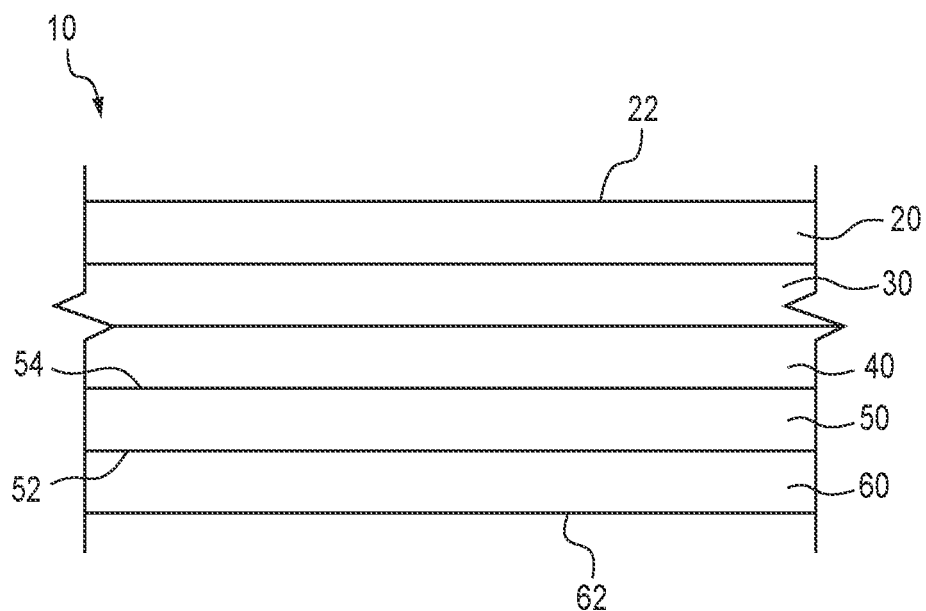
FIG. 1 is a schematic cross sectional view illustrating an embodiment of a multilayer laminate in accordance with the present subject matter.

The present subject matter generally relates to multilayer laminates comprising (i) a support layer having two oppositely directed faces, (ii) a first release layer disposed on one of the faces of the support layer, (iii) a second release layer disposed on the other face of the support layer, (iv) at least one preformed image or graphic disposed on at least one of the first and second release layers, (iv) and at least one layer of an adhesive disposed on the at least one image or graphic. The multilayer laminates may include additional layers and/or materials such as a clear coat layer disposed between the image or graphic and the adjacent release layer, as described herein. In particular embodiments of the present subject matter, the multilayer laminates are in the form of faceless labels as described in greater detail herein.

In particular versions of the present subject matter, the release agents disposed along opposite faces of the support layer are selected to provide certain release forces, i.e., adhesive forces. Generally, the adhesive force between (i) the surface of interest to which the image or graphic is being transferred, and (ii) the adhesive, is greater than the adhesive force between (i) the image or graphic (or clear coat layer) and (ii) the release layer on an opposite face of the support layer. Specifically, and typically for embodiments in which the multilayer laminate is in a wound roll form, the adhesive force along an interface between the release layer on a first face of the support and the immediately adjacent preformed image or graphic, is greater than the adhesive force along an interface between the release layer on the opposite second face of the support and the adhesive layer on the first face of the support from an immediately adjacent section of the multilayer laminate. More specifically, in certain versions of the present subject matter, the ratio of the adhesive force of the second release layer to the release force of the first release layer is within a range of from about 1:1.5 to 1:100, respectively. Unless indicated otherwise, the "first release layer" is the release layer disposed between the image(s)/graphic(s) and the support layer. In the event an optional clear coat layer is included, the first release layer is the release layer disposed between the clear coat layer and the support layer. And the "second release layer" is disposed on an opposite face of the support layer. These aspects are described in greater detail herein.

The present subject matter also provides systems and methods for dispensing and applying preformed images or graphics onto a plurality of articles in a continuous and sequential fashion. The systems and methods are particularly directed to applying preformed images or graphics from a wound roll of the multilayer laminate, sequentially onto a plurality of articles, such as product containers. These aspects of the present subject matter and others, are all described in greater detail herein.

Support Layer

The multilayer laminates include a support film or layer to provide support for the laminate. The support layer can be formed from a wide array of materials such as polyester film materials, polyolefin film materials or paper, cardboard, or other paper-based materials. Composite materials and combinations thereof are also contemplated. Representative materials for the support include, but are not limited to, polyethylene terephthalate (PET), polyethylene (PE), polypropylene (PP), both oriented and nonoriented, and copolymers thereof. Another example of a potentially suitable film for the support is a layer of polyvinyl chloride (PVC) and copolymers thereof. Additional materials include, but are not limited to, ortho-phthalaldehyde (OPA). For many applications, PET is preferred. In addition, it may be preferred to utilize a biaxially oriented polypropylene (BOPP) material. These materials provide cost savings as they are relatively inexpensive, and they have sufficient stiffness to dispense well.

The support can be utilized at various thicknesses in the laminate assembly. The support can have a typical thickness of from about 0.4 to about 4.7 mil (10 to 120 microns), and in certain embodiments a thickness of from about 1.0 to about 3.3 mil (25 to 85 microns).

In those instances in which the support is in the form of a plastic film, the support may have a thickness of about 0.5 to about 7 mil (13 to 178 microns), particularly about 0.9 to about 3.0 mil (23 to 76 microns), even more particularly about 1.4 to about 2 mil (36 to 51 microns).

In those instances in which the support is a plastic film of the type described herein, the support may also be optically clear. As can readily be appreciated, one benefit to using a clear material as the support is that, if desired, one can inspect the quality of the preformed image or graphic of the laminate by looking at the image or graphic through the support (from which perspective the image or graphic appears as it will on the labeled article).

In those instances in which the support is in the form of a paper, the paper may be a paper of the type described in U.S. Pat. No. 6,113,725 for example. Examples of papers that may be suitable for use as the support may include plain paper, clay-coated paper, polymer-impregnated paper, and polymer-coated paper. The thickness of the paper may be in the range of about 1 mil (25 microns) to about 10 mil (254 microns), more particularly about 2 mil (50 microns) to about 6 mil (125 microns), even more particularly about 3 mil (75 microns) to about 4 mil (100 microns). The basis weight of the paper may be in the range of about 10 lbs/1300 $ft^2$ to about 100 lbs/1300 $ft^2$, more particularly about 20 lbs/1300 $ft^2$ to about 60 lbs/1300 $ft^2$, even more particularly about 30 lbs/1300 $ft^2$ to about 40 lbs/1300 $ft^2$.

Release Layers

In accordance with another aspect of the subject matter, the multilayer laminates include two or more release or liner layers. At least one of the release layers is disposed immediately adjacent to the support layer in the laminate. That release layer provides a release surface which is immediately adjacent to, and in contact with, the images and/or graphics. The composition of the release layers (or release coatings) may be the same as each other. Alternatively, the composition of the release layers may be different than each other.

A wide variety of release materials such as those typically used for pressure sensitive tapes and labels are known, including silicones, alkyds, stearyl derivatives of vinyl polymers (such as polyvinyl stearyl carbamate), stearate chromic chloride, stearamides and the like. Fluorocarbon polymer coated release liners are also known but are relatively expensive. For most pressure sensitive adhesive applications, silicones are by far the most frequently used materials. Silicone release coatings have easy release at both high and low peel rates, making them suitable for a variety of production methods and applications. In certain embodiments, at least one of the first and the second release layers include one or more silicone materials. In particular embodiments, both of the first and the second release layers include one or more silicone materials.

Known silicone release coating systems generally include a reactive silicone polymer, e.g., an organopolysiloxane (often referred to as a "polysiloxane," or simply, "siloxane"); a cross-linker; and a catalyst. After being applied to the adjacent layer or other substrate, the coating generally must be cured to cross-link the silicone polymer chains, either thermally or radiatively (by, e.g., ultraviolet or electron beam irradiation).

Based on the manner in which they are applied, three basic types of silicone release coatings used in the pressure sensitive adhesive industry are known: solvent borne, water borne emulsions, and solvent free coatings. Each type has advantages and disadvantages. Solvent borne silicone release coatings have been used extensively but, because they employ a hydrocarbon solvent, their use in recent years has tapered off due to increasingly strict air pollution regulations, high energy requirements, and high cost. Indeed, the energy requirements of solvent recovery or incineration generally exceed that of the coating operation itself.

Water borne silicone emulsion release systems are as well known as solvent systems, and have been used on a variety of pressure sensitive products, including tapes, floor tiles, and vinyl wall coverings. Their use has been limited, however, by problems associated with applying them to paper substrates. Water swells paper fibers, destroying the dimensional stability of the release liner backing and causing sheet curling and subsequent processing difficulties.

Solventless or solvent-free silicone release coatings have grown in recent years and now represent a major segment of the silicone release coating market. Like other silicone coatings, they must be cured after being applied to the flexible liner substrate. Curing produces a cross-linked film that resists penetration by the pressure sensitive adhesive.

Informative descriptions of various release materials, their characteristics, and incorporation in laminate assemblies are provided in U.S. Pat. Nos. 5,728,469; 6,486,267; and US Published Patent Application 2005/0074549, owned by the Assignee of the present application. It is also contemplated that various waxes known in the art could be used for the release material or utilized in the release layer.

In certain embodiments of the present subject matter, the multilayer laminates utilize release layers that are relatively thin. For example, a typical release layer thickness is from about 1 to about 4 microns. In particular embodiments, the thickness of the release layer is from about 1 to about 2 microns.

Materials suitable for use as a release coating may include acrylics, silicones, polyurethanes, and the like. For certain embodiments, a commercially available PET23 release liner from Mitsubishi can be used. The noted PET23 release liner is a film of polyethylene terephthalate (PET) coated with a siliconized release agent. In certain embodiments, a silicone coated paper support layer available from Avery Graphics under the designation Sample 546 Silver can be used. That material is a white mando backing coated with 9630 silicones at a coat weight of 1.15 g/m$^2$. Particular and additional examples of materials for use in the release coating may also include HYCAR 26706 acrylic emulsion (The Lubrizol Corporation, Wickliffe, Ohio) and the silicone emulsion system 3200 from Dow Corning Corporation, Midland, Michigan (base silicone SM3200, CRA agent SM3030 and catalyst emulsion SM 3010). It may be desirable to cross-link the polymer in the release coating to achieve an elevated softening point. Certain cross-linkers that can bind reactively with the carboxylic group of acrylic and urethane emulsions may be used. An example of an effective cross-linker is XAMA 7, a polyaziridine oligomer from Ichemco srl (Cuggiono, Italy). Other cross-linkers that may be used include water-dispersible polyisocyanates, such as BAYHY-DUR 302 and 303 from Bayer Corp., and titanium and zirconium cross-linkers from E.I. du Pont de Nemours and Company (Wilmington, Del.), such as TYZOR TE and LA (Ti-derived water-stable) and TYZOR ZEC (Zr-derived).

The release coating may further include additives, such as release modifiers, rheology agents, surfactants, leveling agents, and defoamers. Examples of such additives may include release modifiers, such as MICHEM 43040 (polypropylene wax emulsion) from Michelman, Inc. (Cincinnati, Ohio), and Fluids 190 and 193 from Dow Corning Corporation (Midland, Michigan); low foam surfactants, such as TRITON CF-10 from The Dow Chemical Company (Midland, Michigan) and ZONYL FSO from E.I. du Pont de Nemours and Company (Wilmington, Delaware); rehology modifiers, such as CELLOSIZE ER15 from The Dow Chemical Company; defoamers, such as BYK 19 and 24 from Byk-Chemie GmbH (Wesel, Germany); dispersing agents for inorganic fillers, such as SOLSPERSE 40000 from The Lubrizol Corporation (Wickliffe, Ohio) and DISPERBYK 191, 192 from Byk-Chemie GmbH (Wesel, Germany). It is also contemplated that additional polymers such as an SBR latex could be included in the release formulation to increase the release force, i.e., the adhesive force.

Other additives that may be included in the release coating comprise inorganic fillers, such as talc, calcium carbonate, clay, silica, etc. The presence of such inorganic fillers may give a matte-look to the final multilayer laminate, as well as improve the break-edge selectivity of the transferred image. Examples of such inorganic fillers may include NYTAL 7700 talc pigment (The Cary Company, Addison, Illinois), VANTALC PC and 4000 talc powders (R.T. Vanderbilt Company, Inc., Norwalk, Connecticut), and ULTRA-WHITE 90 clay (Engelhard Corporation, Iselin, New Jersey). The particle size for the filler may be in the range of about 0.5 to 30 microns, particularly about 1 to 20 microns, more particularly about 2 to 10 microns.

The first and second release layers and, respectively, can be formed from a wide range of release materials known in the art such as for example silicones and silicone-based materials. The predominant materials used for release layers are silicone formulations. Numerous silicone release coating materials are known based upon polysiloxanes. Formulation, design, and application of these materials in laminates and labeling systems are described in numerous patents by the present Assignee including: U.S. Pat. Nos. 5,728,469; 5,543,231; 5,562,992; 5,494,945; 5,654,093; 6,423,406; 5,084,317; 6,235,363 and 5,843,549. It is contemplated that the release layer(s) could be free of silicones and/or polysiloxanes. The present subject matter includes the use of nearly any release material.

In certain embodiments, the release layer(s), i.e. either or both of the first and second release layers, exhibits a particular release force. The release force is the amount of force necessary to separate the release layer from an immediately adjacent layer. This force varies upon a variety of factors including the release material, the material of the adjacent layer, the surface characteristics of these layers, the thickness of the layers, uniformity of the release layer, and physical and chemical interactions between the release material and that of the adjacent layer.

In particular embodiments of the present subject matter, the adhesive force of the first layer is from about 30 g/inch to about 100 g/inch. And, the adhesive force of the second layer is from about 10 g/inch to about 40 g/inch. These values of adhesive forces are taken with regard to an ink layer as described herein, and with regard to comparable layered assemblies. It will be understood, however, that the present subject matter includes the use of release layers that exhibit adhesive forces greater than and/or less than these representative ranges.

As is known by those skilled in the art, the force necessary to achieve release between two faces or layers, i.e. the release force, is typically measured by a TLMI release tester. A wide variety of instruments are commercially available for measuring TLMI release properties, such as AR-1000 adhesion/release tester available from Ichemco S.R.L. of Italy.

In certain embodiments, the ratio of the adhesive force of the second release layer to the adhesive force of the first release layer is about 1:3, respectively. However, the present subject matter includes ratios as low as 1:1.5, respectively. It is believed that there is no upper limit for this ratio so long as the first release layer can still be separated from the image/graphic, such as when the image/graphic is applied to a surface and the support layer is separated therefrom. For purposes of quantifying a suitable range for the ratio, an upper limit of 1:100 is contemplated. Thus, the present subject matter includes ratios of the adhesive force of the second release layer to the adhesive force of the first release layer of from about 1:1.5 to about 1:100, respectively.

Particular pairings of release coatings or layers can be provided by selective incorporation of one or more agents to increase or decrease the adhesive force of one or both release layers. That is, the adhesive force of one release layer can be adjusted while leaving alone the adhesive force of the other release layer. For example, an SBR latex incorporated within a silicone emulsion results in an increased adhesive force in the resulting release layer. A solventless silicone could be used to provide a relatively low adhesive force. Alternatively, the adhesive force of one release layer can be adjusted and the adhesive force of the other release layer can also be adjusted.

Image or Graphic

The preformed image(s) or graphic(s) are formed from one or more inks, dyes, pigmented materials, and/or other agents typically used to form indicia, letters, numbers, and/or graphics. These materials are collectively referred to herein as "inks." However, it will be appreciated that the present subject matter includes the use of other agents and/or materials for forming the images or graphics beyond those noted herein and specifically including other compositions which are typically not considered as inks in the print industry. And so, it will be appreciated that the term "ink" as used herein encompasses nearly any material used for forming the image or graphic in the multilayer laminates. Generally, in many embodiments of the present subject matter, the inks are water-based flexographic inks. A particular class of inks which can be used for forming the image(s) or graphic(s) are UV-curable inks such as those available under the designation Flint Flexocure Force from the Flint Group of Plymouth, MN These inks can be readily applied using a flexographic press.

The ink may comprise one or more plasticizers. The plasticizers may be, for example, conventional plasticizers, in particular N-substituted or unsubstituted benzene sulfonamides, phthalic acid esters, as well as adipic acid and/or sebacic acid esters, trialkyl phosphates, aliphatic polyesters, as well as other polymeric plasticizers, such as, for example, soft urea resins. (C.f. H. K. Felger, Kunststoff-Handbuch volume 1/1C, Hanser-Verlag 1985 and H. F. Mark et al. Encyclopedia of Polymer Science and Engineering, Supplemental Volume pages 568-647, J. Wiley 1989). Particular plasticizers and plasticizer combinations are those which are liquid at room temperature or are those which, over a temperature interval of 0° C. to 60° C., exhibit a low viscosity (1-100 cp) and are miscible in a wide range of solvents.

Specific examples of suitable sulfonamide plasticizers include, but are not limited to, the following: N-butylbenzene sulfonamide (BBSA); p-toluene sulfonamide (PTSA); a mixture of o-toluenesulfonamide and p-toluenesulfonamide (O/PTSA); N-(2-hydroxypropyl)benzene sulfonamide (HPBSA); a mixture of N-ethyl o- and p-toluene sulfonamide (N-E-O/PTSA); N-ethyl-p-toluene sulfonamide (N-E-PTSA); N-methyl-p-toluene sulfonamide (MTSA); N-butyl-p-toluene sulfonamide (BTSA); 2-carboxybenzene sulfonamide and its ammonium salt; and 4-carboxybenzene sulfonamide and its ammonium salt.

Specific examples of suitable ester plasticizers include, but are not limited to, the following: dioctyl phthalate, diisodecyl phthalate, diethylhexyl phthalate, di-C7-C11-n-alkyl phthalate, tricresyl phosphate, dibenzyltoluene (LIPINOL® T, product of Hüls AG), 2,2,4-trimethyl-1,3-pentanediol dibenzoate (BENZOFLEX® 354, product of Velsicol Chemical Corporation, Rosemont, Ill.) and benzyloctyl phthalate.

The plasticizer concentration in the ink may range from about 1-100% by weight, in certain embodiments about 20-50% by weight, and particularly about 25-35% by weight. The ink may also include a colorant, such as a pigment or a dye; alternatively, the ink may lack a colorant and may simply be a plasticizer-based, clear ink. Where the ink includes a pigment, a wide variety of organic and inorganic pigments, alone or in combination, may be suitable. Such pigments may include those disclosed, for example, in U.S. Pat. Nos. 5,026,427; 5,086,698; 5,141,556; 5,160,370; and 5,169,436. In particular, pigments that may be suitable for use in the ink include, for example, azo pigments, monoazo pigments, disazo pigments, azo pigment lakes, R-Naphthol pigments, Naphthol AS pigments, benzimidazolone pigments, disazo condensation pigments, metal complex pigments, isoindolinone and isoindoline pigments, polycyclic pigments, phthalocyanine pigments, quinacridone pigments, perylene and perinone pigments, thioindigo pigments, anthrapyrimidone pigments, flavanthrone pigments, anthanthrone pigments, and dioxazine pigments. The pigment particles may have a particle size that permits their being jetted through a print head. Preferably, such pigment particles have a mean particle size of less than about 200 nm, more preferably less than about 80 nm.

For applications in which the ink includes a dye, a variety of dyes may be used. Examples of solvent-soluble dyes that may be suitable include Neozapon Red 492 (BASF); Orasol Red G (Ciba); Basacid Blue 750 (BASF), Neozapon Black X51 (BASF), Sudan Blue 670 (BASF), Sudan Yellow 146 (BASF), Sudan Red 462 (BASF), mixtures thereof and the like. Examples of water-dispersible dyes may include black dyes, such as Basacid X34, X38, X40 (BASF), Duasyn® NB-SF Direct (Clariant Corp), magenta dyes, such as Basacid Red 316, 400, 495 (BASF), Acid Red 52, Acid Red 82, Acid Red 180, Acid Red 249, yellow dyes, such as Basacid Yellow 93, 99 (BASF), Acid Yellow 17, Acid Yellow 23, Acid Yellow 250, Reactive Yellow 39 and cyan dyes, such as Acid Blue 9, Direct Blue 199, Reactive Blue 2 or Basacid Blue 762 (BASF).

The ink may further comprise a humectant, particularly where the ink is intended for use in an ink-jet printer. In such a case, the humectant may help prevent the ink from drying out or crusting in the orifices of the printhead. Humectants are mostly effective in water-based ink formulations. Examples of humectants which may be suitable include polyhydric alcohols, such as ethylene glycol, diethylene glycol, triethylene glycol, propylene glycol, tetraethylene glycol, polyethylene glycol, glycerol, 2-methyl-2,4-pentanediol 1,2,6-hexanetriol and thioglycol, with glycerol being preferred.

The ink may further comprise one or more organic solvents, such as cyclohexanone, methylethylketone, methylbutylketone, acetone, toluene, ethyl acetate, mineral spirits, butyl and ethyl lactate, and Aromatic 100 (an aromatic solvent mix from Exxon Mobile). Water-miscible, organic solvents may also be used in the ink, mixed in various proportions with water when they act as co-solvents. Examples of such water-miscible, organic solvents may include lower alkyl mono- or di-ethers derived from alkylene glycols, such as ethylene glycol mono-methyl or mono-ethyl ether, diethylene glycol mono-methyl or mono-ethyl ether, propylene glycol mono-methyl or mono-ethyl ether, triethylene glycol mono-methyl or mono-ethyl ether, diethylene glycol di-methyl or di-ethyl ether, and diethylene glycol monobutylether; nitrogen-containing cyclic compounds, such as pyrrolidone, N-methyl-2-pyrrolidone, and 1,3-dimethyl-2-imidizolidinone; and sulfur-containing compounds, such as dimethyl sulfoxide and tetramethylene sulfone. Other suitable solvents may be disclosed, for example, in U.S. Pat. Nos. 4,626,284, 4,703,113, and 4,963,189, all of which are incorporated herein by reference.

The ink may additionally include other additives to obtain one or more desired characteristics, such additives including, but not being limited to, surfactants, pH buffers, antioxidants, and the like.

The ink may be formulated for various different types of print dispensing devices including, but not limited to, digital printing devices, such as ink jet printers, fountains and curtains and writing instruments, such as pens or markers or patterned coating applicators.

In certain embodiments, particular coatweights of ink are useful. In one embodiment, the amount of ink laydown is from about 0.5 to 4 g/m$^2$ (gsm) for process colors, and from about 3 to 15 for opacifying white ink.

In certain embodiments, the ink is radiation curable.

Adhesive

The adhesive layer may comprise a pressure sensitive adhesive (PSA) which bonds the laminate or at least portions thereof to a surface, typically under applied pressure, at room temperature. The adhesive layer may be a continuous or discontinuous layer, and it may comprise one or a mixture of two or more adhesives. The adhesive layer may be a patterned adhesive layer with relatively strong adhesive tack level in some areas and a relatively weak adhesive in other areas. Generally, in most embodiments of the present subject matter, the adhesives are printable.

In one embodiment of the present subject matter described herein, the pressure sensitive adhesive comprises an acrylic adhesive material, particularly a crosslinked acrylic resinous material, and more particularly, a crosslinked acrylic emulsion. A particularly useful adhesive material comprises an internally crosslinked acrylic emulsion. These pressure sensitive adhesive materials provide a useful combination of low tack, peel and flow properties with a sufficient level of cohesive strength at a useful (thin) coat weight for providing the differential release properties described herein. High molecular weight acrylic adhesives and externally crosslinked acrylic adhesives also may be used to produce the desired combination of functional properties.

The adhesive may comprise a rubber based adhesive, acrylic adhesive, vinyl ether adhesive, silicone adhesive, or mixture of two or more thereof. The adhesive may be applied to the laminate as a hot melt, solvent-based or water based adhesive. The adhesive materials that are useful may contain as a major constituent an adhesive polymer such as an acrylic-type polymer; block copolymer; natural, reclaimed, or styrene-butadiene rubber; tackified natural or synthetic rubber; a copolymer of ethylene and vinyl acetate; an ethylene-vinyl-acrylic terpolymer; polyisobutylene; or poly (vinyl ether). Other materials may be included in the adhesive such as tackifying resins, plasticizers, antioxidants, fillers, and waxes.

In certain embodiments, water-based pressure sensitive adhesives can be used. And in particular embodiments, water-based pressure sensitive adhesives are used in combination with water-based flexographic inks.

A description of useful pressure sensitive adhesives may be found in *Encyclopedia of Polymer Science and Engineering*, Vol. 13. Wiley-Interscience Publishers (New York, 1988). Additional description of useful pressure sensitive adhesives may be found in *Encyclopedia of Polymer Science and Technology*, Vol. 1, Interscience Publishers (New York, 1964).

Pressure sensitive adhesives that may be used include the hot melt pressure sensitive adhesives available from H.B. Fuller Company, St. Paul, Minn. Other useful pressure sensitive adhesives include those available from Century Adhesives Corporation, Columbus, Ohio.

Conventional PSAs, including silicone-based PSAs, rubber-based PSAs, and acrylic-based PSAs are useful in certain applications or embodiments. Another commercial example of a hot melt adhesive is, sold by Ato Findley, Inc., of Wauwatusa, Wisconsin In addition, rubber-based block copolymer PSAs described in U.S. Pat. No. 3,239,478 also can be used.

The adhesive compositions may contain at least one solid tackifier resin component. A solid tackifier is defined herein as one having a softening point above 80° C. When the solid tackifier resin component is present, the adhesive compositions may comprise from about 40% to about 80% by weight of a thermoplastic elastomer component, in one embodiment from about 20% to about 60% by weight, and in another embodiment from about 55% to about 65% by weight of a solid tackifier resin component. The solid tackifier reduces the modulus of the mixture sufficiently to build tack or adhesion. Also, solid tackifiers (particularly the higher molecular weight solid tackifiers (e.g., Mw greater than about 2000) and those having a lower dispersity (Mw/Mn being less than about 3) may be less sensitive to migration into the polymer film layer. This is desirable since migration of tackifier into the film layer may cause dimensional instability.

The solid tackifier resins include hydrocarbon resins, rosin, hydrogenated rosin, rosin esters, polyterpene resins, and other resins which exhibit the proper balance of properties. A variety of useful solid tackifier resins are available commercially such as terpene resins which are sold under the trademark Zonatac by Arizona Chemical Company, petroleum hydrocarbons resins such as the resins sold under the trademark Escorez by Exxon Chemical Company, or Wingtack 95, a synthetic tackifier resin available from Goodyear, Akron, Ohio.

The adhesive layer also may contain one or more pigments to enhance the opacity of the ink layers and permit use of thinner ink layers to achieve desired levels of opacity. Any of the pigments identified herein may be used. Examples include titanium dioxide and carbon black. The pigment volume concentration may range up to about 10%, in one embodiment from about 5% to about 10%, and in another embodiment from about 2% to about 8%.

The adhesive compositions also may include other materials such as antioxidants, heat and light stabilizers, ultraviolet light absorbers, fillers, colorants, antiblocking agents, reinforcing agents, and processing aids.

The adhesive compositions may contain inorganic fillers and other organic and inorganic additives to provide desired properties. Examples of useful fillers include calcium carbonate, titanium dioxide, metal particles, and fibers.

In certain embodiments, particular coatweights of adhesive are useful. In one embodiment, the amount of adhesive applied to the multilayer laminate is within a range of from about 4 to 20 g/m$^2$ (gsm), and particularly from about 6 to 15 g/m$^2$.

In particular embodiments, the adhesive is radiation curable.

Optional Clear Coat

The multilayer laminates in certain embodiments, can include an optional clear coat or varnish layer. Typically, the clear coat layer is disposed between the ink, i.e., the preformed image(s) and/or graphic(s), and the first release layer. The clear coat typically comprises a solid polymeric material that can be extruded as a transparent film. The clear coat polymer is a solid polymer in that it contains essentially no solvents that require high temperature exposure for drying or otherwise hardening the clear coat film. The resulting film is a melt cast film in that it is produced by melting the extrudable polymeric starting material and coating it onto the casting sheet through the narrow extrusion die. The film is cast on the traveling carrier sheet at production speeds without added solvents to produce the film-forming material. This process results in a level of molecular orientation in the finished film.

The polymeric material can comprise various thermoplastic, thermoformable and weatherable polymers such as acrylics, urethanes, vinyls, fluoropolymers, and blends thereof. A wide array of UV-curable overprint varnishes are known and could be used.

Polyvinylidene fluoride (PVDF) and polyvinyl fluoride (PVF) are suitable fluoropolymers for certain embodiments. A particular extrudable polymeric material comprises a blend or alloy of PVDF and acrylic resins. In specific embodiments, the acrylic resin is polymethyl methacrylate (PMMA) or copolymers thereof, although polyethyl methacrylate (PEMA) also can be used. In a particular formulation the clear coat material comprises from about 50 percent to about 70 percent PVDF and from about 30 percent to about 50 percent acrylic resin, by weight of the total solids present in the PVDF/acrylic formulation. These solids ranges are based on the relative proportions of the PVDF and acrylic components only in the clear coat formulation. Other minor amounts of solids such as UV stabilizers, pigments, and fillers also may be contained in the clear coat formulation.

In particular embodiments, certain coatweights of clear coat material are useful, such as from about 0.5 to 20 g/m$^2$ (gsm), depending upon desired quality and appearance.

In certain embodiments, the clear coat material is radiation curable.

Additional Aspects

FIG. 1 is a schematic cross sectional view of a multilayer laminate 10 in accordance with the present subject matter. The laminate 10 comprises a support layer 50 having two oppositely directed faces 52, 54. The laminate also comprises two release layers 40 and 60. One of the release layers 40 is disposed on and contacts the face 54 of the support 50. And the other release layer 60 is disposed on and contacts the face 52 of the support 50. The exposed face 62 of the release layer 60 constitutes a face, and typically a rear or underside, of the laminate 10. The laminate 10 also comprises an ink layer or region(s) 30 disposed on the release layer 40. And, the laminate 10 additionally comprises a layer of an adhesive 20 disposed on the ink layer 30. Thus, as shown in FIG. 1, the ink layer or region(s) 30 are disposed between and captured by the adhesive layer 20 and the release layer 40. Typically, an outer face 22 of the adhesive layer 20 constitutes another face, and typically a front or topside, of the laminate 10.

Figure 2:
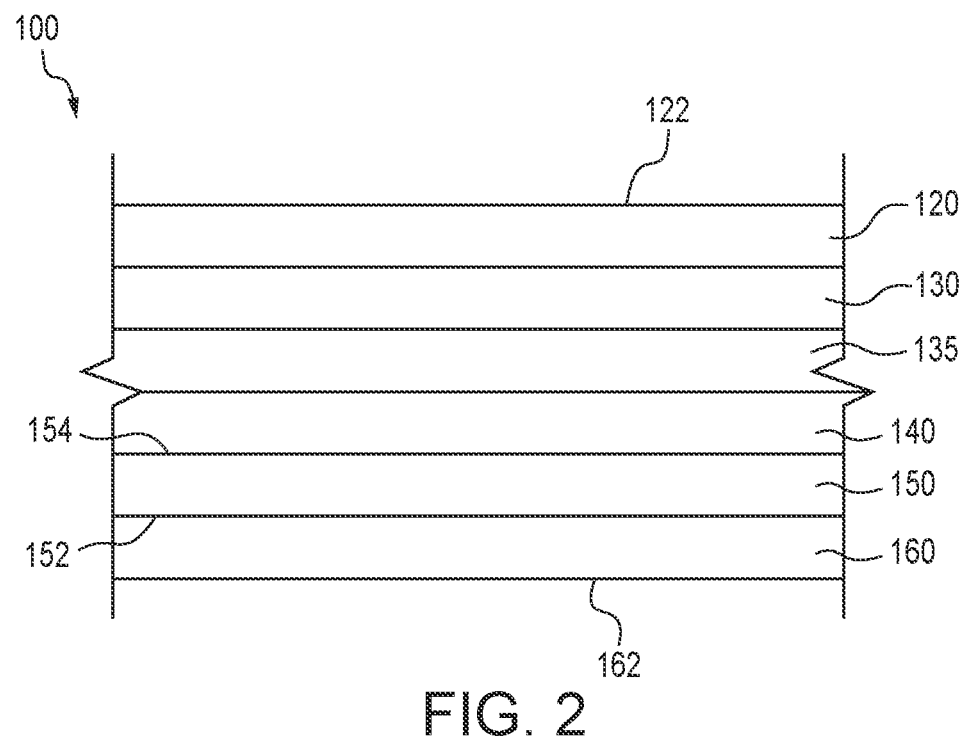
FIG. 2 is a schematic cross sectional view illustrating another embodiment of a multilayer laminate in accordance with the present subject matter.

FIG. 2 is a schematic cross sectional view of another multilayer laminate 100 in accordance with the present subject matter. The laminate 100 comprises a support layer 150 having two oppositely directed faces 152, 154. The laminate also comprises two releases layers 140 and 160. One of the release layers 140 is disposed on and contacts the face 154 of the support 150. And the other release layer 160 is disposed on and contacts the face 152 of the support 150. The exposed face 162 of the release layer 160 constitutes a face, and typically a rear or underside, of the laminate 100. The laminate 100 also comprises a clear coat (or varnish) layer 135. The clear coat layer 135 is disposed on the release layer 140. The laminate 100 also comprises an ink layer or region(s) 130 disposed on the clear coat layer 135. And, the laminate 100 additionally comprises a layer of an adhesive 120 disposed on the ink layer 130. Thus, as shown in FIG. 1, the ink layer or region(s) 130 are disposed between and captured by the adhesive layer 120 and the clear coat layer 135. Typically, an outer face 122 of the adhesive layer 120 constitutes another face, and typically a front or topside, of the laminate 100.

Figure 3:
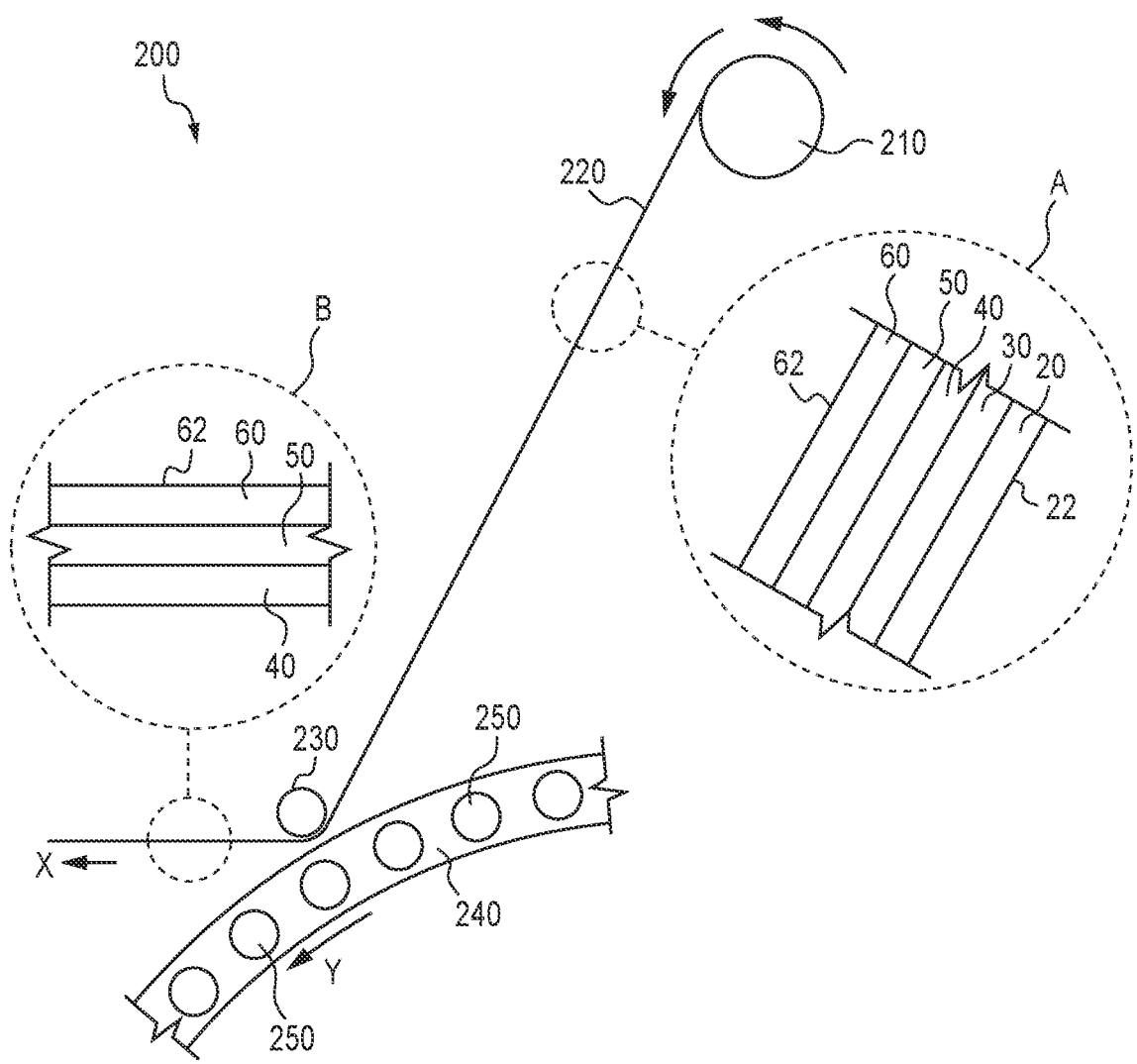
FIG. 3 is a schematic diagram illustrating a system and method in accordance with the present subject matter.

FIG. 3 is a schematic diagram illustrating a system 200 and related method in accordance with embodiments of the present subject matter. The system 200 comprises a web or material transfer line generally denoted as 220 for dispensing a wound or rolled source 210 of the multilayer laminate, described herein. The line 220 typically includes a dispensing and support apparatus for rotatably dispensing the roll 210. As shown in the detailed schematic view represented as view A in FIG. 3, the wound source 210 includes a multilayer laminate as previously described in FIG. 1, i.e., comprising a support layer 50 disposed between two release layers 40, 60, and an image or graphic layer 30 disposed between an outer adhesive layer 20 and the release layer 40. The transfer line 220 directs the multilayer laminate from the wound roll 210 to a plurality of articles 250 which are to receive the image(s) or graphic(s) 30. The articles 250 are typically moving and in many applications are disposed alongside and positioned adjacent to an image application apparatus which may be in the form of a roller 230. In particular embodiments, the image application apparatus or roller 230 is configured to contact the outermost adhesive layer of the laminate to an article or surface of interest and then separate at least the support layer of the laminate from the contacted adhesive layer and the image or graphic which is thereby applied to the article or surface. Specifically, the articles 250 can be displaced by a conveyor 240 or other assembly as known in the art moving in the direction of arrow Y, and are positioned alongside the multilayer laminate moving in the direction of arrow X which is between the roller 230 and the conveyor 240. An outer face or region of an article 250 is contacted with an outer face 22 of the multilayer laminate such that the adhesive layer 20 is at least partially adhered to the article 250. As the multilayer laminate travels past the roller 230, the adhesive layer 20 and image(s) or graphic(s) 30 separate from the multilayer laminate and particularly, separate along the release layer 40. The image or graphic 30 is then transferred to the article 250. Detail B in FIG. 3 schematically illustrates a cross section of the multilayer laminate after transfer of the image(s) and graphic(s) to the articles 250.

Figure 4:
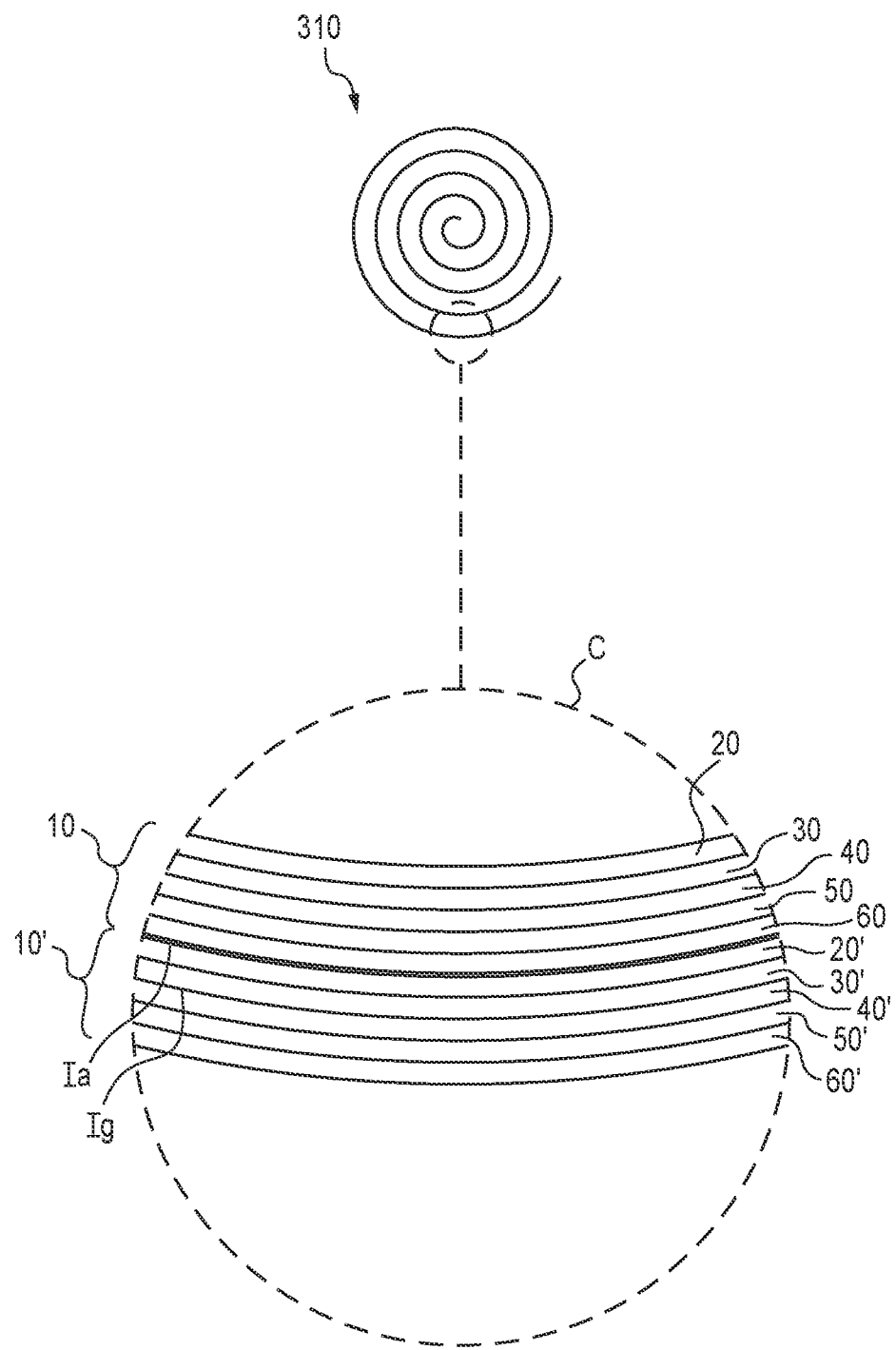
FIG. 4 is a schematic illustration showing an arrangement of layers in a rolled or wound laminate assembly in accordance with the present subject matter.

As previously noted, in certain embodiments of the present subject matter, the release materials disposed along opposite faces of the support layer are selected to provide particular adhesive forces. Referring to FIG. 4, a schematic view of a wound roll 310 of the multilayer laminate 10 is shown. The multilayer laminate 10 is as previously described in conjunction with FIG. 1. A detailed or enlarged view of a side region of the roll 310 is depicted in view C. There, adjacent portions of the laminate are shown as 10 and 10'. Selection of adhesive forces associated with the release layers 40 and 60 (and 40' and 60') can be appreciated by considering the multilayer laminate when in a wound or rolled form. The adhesive force along an interface between the release layer 40' on a first face of the support 50' and the immediately adjacent preformed image or graphic 30', shown as Ig (i.e., interface "g") in FIG. 4, is greater than the adhesive force along an interface between the release layer 60 on the opposite second face of the support 50 and the adhesive layer 20' on the first face, shown as Ia (i.e., interface "a") in FIG. 4.

As noted, in certain embodiments, the release coatings and/or their materials can be selected so that the adhesive forces along interfaces Ig and Ia, are within a particular range of ratios relative to one another. Specifically, in this regard, a particular relationship exists between the adhesive forces along these interfaces as defined by Equation (1):

$$\frac{1}{1.5} \leq \frac{\text{Adhesive Force Along } Ia}{\text{Adhesive Force Along } Ig} \leq \frac{1}{100} \qquad (1)$$

For certain embodiments, one or more of the ink(s), optional clear coat(s), and the adhesive may be curable and particularly UV-curable. When utilizing curable materials, the materials are initially deposited such as by printing in their uncured, liquid state. In many embodiments of the present subject matter, after deposition of a curable material, curing is performed prior to application of the next material or layer. This practice avoids mixing of adjacent layers of materials. For embodiments in which the multilayer laminates are formed into wound rolls, if curable materials are included, such materials are cured prior to winding or forming a roll. As will be understood, prior to application of an image and/or graphic to a surface of interest, the image or graphic is cured. And, generally, the other components of the multilayer laminate are also in a cured state prior to application. However, the present subject matter also contemplates practices in which one or more curable materials are partially cured prior to application to a surface of interest, and then after application are further or fully cured.

In certain embodiments and/or applications, the multilayer laminates as described herein are used in labeling operations to apply the preformed images or graphics on a plurality of articles such as consumer products or containers. In particular versions of the subject matter, the multilayer laminates are used to apply the images/graphics in a sequential fashion and continuously from a wound roll of the multilayer laminate. In these embodiments and/or applications, the applied layers of (i) adhesive, (ii) image(s) and/or graphic(s), and (iii) optionally with one or more other layers, constitute a faceless label or faceless label assembly.

The various multilayer laminates of the present subject matter can be provided in a variety of forms and configurations including but not limited to rolls, discrete sheets, and continuous rolled sheets in which regions of the web are separated from one another by perforations or other weakened regions.

In certain embodiments and/or applications, after application of the image(s) and/or graphic(s), the support layer having at least one of its faces coated with a release layer, can be re-used.

A wide array of applications are contemplated for the present subject matter. Applications in which a "label-free look" or "no-label look" are desired such as in labeling of clear or transparent containers, are of particular importance.

Many other benefits will no doubt become apparent from future application and development of this technology.

All patents, published applications, standards and articles noted herein are hereby incorporated by reference in their entirety.

It will be understood that any one or more feature or component of one embodiment described herein can be combined with one or more other features or components of another embodiment. Thus, the present subject matter includes any and all combinations of components or features of the embodiments described herein.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A multilayer laminate comprising:
a support layer defining two oppositely directed faces;
a first release layer disposed on one of the faces of the support layer;
a second release layer disposed on another of the faces of the support layer;
a single layer comprising at least one preformed image or graphic disposed on the first release layer;
wherein the at least one preformed image or graphic is in the form of at least one of indicia, letters, numbers, and graphic designs;
at least one adhesive layer disposed on the at least one preformed image or graphic; and
a clear coat layer disposed between the first release layer and the at least one preformed image or graphic;
wherein a release force of the first release layer is greater than a release force of the second release layer; and
wherein the clear coat layer comprises a solid polymeric material and the solid polymeric material is a solid polymer in that it contains essentially no solvents that require high temperature exposure for drying or otherwise hardening the clear coat layer;
wherein the solid polymeric material comprises from 50% to 70% polyvinylidene fluoride (PVDF) and from 30% to 50% acrylic resin, by weight of the total solids present in the PVDF/acrylic formulation; and
wherein the clear coat layer is in contact with both of the first release layer and the at least one preformed image or graphic.

2. The laminate of claim 1, wherein a ratio of the release force of the second release layer to the release force of the first release layer is within a range of from 1:1.5 to 1:100, respectively.

3. The laminate of claim 1, wherein the support layer includes a material selected from the group consisting of polyester film materials, polyolefin film materials, paper materials, composite materials, and combinations thereof.

4. The laminate of claim 1, wherein the support layer has thickness of from about 0.4 to about 4.7 mil.

5. The laminate of claim 1, wherein the first release layer and the second release layer have different compositions.

6. The laminate of claim 1, wherein at least one of the first release layer and the second release layer include a silicone material.

7. The laminate of claim 6, wherein both of the first release layer and the second release layer include a silicone material.

8. The laminate of claim 1, wherein the adhesive layer comprises a pressure sensitive adhesive.

9. The laminate of claim 8, wherein the pressure sensitive adhesive comprises an acrylic adhesive material.

10. The laminate of claim 1, wherein the at least one preformed image or graphic is formed from at least one of inks, dyes, pigmented materials, and non-ink compositions.

11. The laminate of claim 1, wherein the laminate is in a roll form.

12. The laminate of claim 1, wherein the single layer of the at least one preformed image or graphic comprises one or more regions of printed images or graphics.

13. The laminate of claim 1, wherein the at least one preformed image or graphic comprises a water based flexographic ink.

14. A system for applying a preformed image or graphic from a multilayer laminate to an article, the system comprising:
   a multilayer laminate of claim 1;
   a transfer line for dispensing the multilayer laminate;
   a conveyor for transporting at least one article; and
   an image application apparatus which contacts the at least one adhesive layer of the laminate to one article transported by the conveyor, and then separates at least the support layer of the laminate from the adhesive layer and the image or graphic thereby applied to the article.

15. A method for applying a preformed image or graphic to a surface, the method comprising:
   providing a multilayer laminate of claim 1;
   contacting the adhesive layer of the multilayer laminate with a surface to receive the image or graphic, and establishing an adhesive bond between the adhesive layer and the surface; and
   separating at least the support layer from the adhesive layer contacting the surface;
   whereby the adhesive layer and the image or graphic remain with the surface and are applied thereon.

\* \* \* \* \*